United States Patent
Jiang et al.

(10) Patent No.: US 10,926,826 B2
(45) Date of Patent: Feb. 23, 2021

(54) PORTABLE ELECTRIC VEHICLE AND METHOD FOR CONTROLLING DRIVE THEREOF

(71) Applicant: South China University of Technology, Guangzhou (CN)

(72) Inventors: Lijun Jiang, Guangzhou (CN); Zhanghong Wu, Guangzhou (CN); Shaohui Pan, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 236 days.

(21) Appl. No.: 15/772,637

(22) PCT Filed: Dec. 9, 2016

(86) PCT No.: PCT/CN2016/109195
§ 371 (c)(1),
(2) Date: May 1, 2018

(87) PCT Pub. No.: WO2017/101737
PCT Pub. Date: Jun. 22, 2017

(65) Prior Publication Data
US 2019/0127010 A1    May 2, 2019

(30) Foreign Application Priority Data
Dec. 16, 2015 (CN) .......................... 201510946633.6

(51) Int. Cl.
*B62K 3/00* (2006.01)
*B62K 15/00* (2006.01)
(Continued)

(52) U.S. Cl.
CPC ............ *B62K 15/008* (2013.01); *B60L 15/20* (2013.01); *B62J 25/00* (2013.01); *B62K 3/002* (2013.01);
(Continued)

(58) Field of Classification Search
CPC . B62K 5/01; B62K 5/10; B62K 3/002; B62K 15/008; B62J 25/00; B62J 25/04; B62B 7/086; B62D 51/02
See application file for complete search history.

(56) References Cited

U.S. PATENT DOCUMENTS

| | | | |
|---|---|---|---|
| 6,367,824 B1* | 4/2002 | Hayashi | B62K 5/05 280/124.103 |
| 6,390,216 B1* | 5/2002 | Sueshige | B60L 50/66 180/65.51 |

(Continued)

FOREIGN PATENT DOCUMENTS

| | | |
|---|---|---|
| CN | 202279192 U | 6/2012 |
| CN | 103158819 A | 6/2013 |

(Continued)

*Primary Examiner* — Steve Clemmons
(74) *Attorney, Agent, or Firm* — Fishman Stewart PLLC

(57) ABSTRACT

The present disclosure relates to a novel portable electric vehicle, which comprises two front-rear folding mechanisms, a left-right folding mechanism, and an operating mechanism, wherein the two front-rear folding mechanisms for supporting a driver are arranged respectively on the left side and the right side of the bottom of the electric vehicle, the rear ends of the front-rear folding mechanisms are both provided with driving wheel mechanisms, and the front ends of the front-rear folding mechanisms are both provided with rotating wheel mechanisms; two ends of the left-right folding mechanism for driving the two front-rear folding mechanisms to get close to each other are connected respectively to the two front-rear folding mechanisms; and the operating mechanism for controlling the running of the electric vehicle is mounted on the left-right folding mechanism. The present disclosure also relates to a method for controlling the drive of the novel portal electric vehicle, which utilizes an Arduino circuit board to control the running of the electric vehicle. The novel portable electric vehicle has the advan- (Continued)

tages of good driving experience, small size, light weight, convenience in folding and easiness in operation, and belongs to the technical field of electric vehicles.

9 Claims, 9 Drawing Sheets

(51) Int. Cl.
*B62J 25/00* (2020.01)
*B60L 15/20* (2006.01)
*B62K 5/01* (2013.01)
*B62K 5/10* (2013.01)

(52) U.S. Cl.
CPC .................. *B62K 5/01* (2013.01); *B62K 5/10* (2013.01); *B62K 2204/00* (2013.01)

(56) References Cited

U.S. PATENT DOCUMENTS

| | | | |
|---|---|---|---|
| 7,226,062 B1* | 6/2007 | Stefano | A63C 17/014 280/87.041 |
| 7,775,547 B2* | 8/2010 | Dotsey | B62B 9/245 280/647 |
| 8,028,777 B2* | 10/2011 | Kakinuma | B62K 11/007 180/65.1 |
| 8,066,294 B2* | 11/2011 | Tsai | B62K 15/008 280/278 |
| 8,627,910 B1 | 1/2014 | Carque | |
| 9,272,739 B2* | 3/2016 | Zaid | B62K 15/008 |
| 9,289,339 B2* | 3/2016 | Gray | A61G 5/124 |
| 9,499,228 B2* | 11/2016 | Chang | B62K 5/01 |
| 2004/0262871 A1* | 12/2004 | Schreuder | B60P 3/007 280/87.1 |
| 2006/0220334 A1* | 10/2006 | Liao | B62D 51/02 280/47.34 |
| 2009/0255747 A1* | 10/2009 | Kasaba | B62D 51/02 180/208 |
| 2010/0301582 A1 | 12/2010 | Tsai | |
| 2013/0032423 A1 | 2/2013 | Chen | |
| 2017/0029060 A1* | 2/2017 | Kim | B62K 3/002 |

FOREIGN PATENT DOCUMENTS

| | | | | |
|---|---|---|---|---|
| CN | 204150178 U | 2/2015 | | |
| CN | 105015673 A | 11/2015 | | |
| CN | 105383623 A | 3/2016 | | |
| CN | 205345238 U | 6/2016 | | |
| DE | 102006042119 A1 * | 3/2007 | ............. | B62B 1/266 |
| KR | 2013/0116423 A | 10/2013 | | |

* cited by examiner

PORTABLE ELECTRIC VEHICLE AND METHOD FOR CONTROLLING DRIVE THEREOF

CROSS-REFERENCE TO RELATED APPLICATIONS

This application claims priority to China Patent Application No. CN201510946633.6 filed on Dec. 16, 2015, and PCT/CN2016/109195 filed Dec. 9, 2016, the contents of which are all incorporated herein by reference in their entirety.

TECHNICAL FIELD

The present disclosure relates to the technical field of electric vehicles and, in particular, to a portable electric vehicle.

BACKGROUND

Since most portable mini-electric vehicles are battery-powered, small in footprint, lightweight and flexible, they have emerged in recent years in many different types on the market. Some electric vehicles such as two-wheeled self-balancing vehicles, one-wheeled self-balancing vehicles and the like, although having the self-balancing ability, do not have a folding mechanism, and thus are not easy for tow, storage and placement. In addition, because of their need to use an additional swing device to maintain the balance of the body, they are heavy and cost long learning time. A four-wheeled electric skateboard, although having simple structure and four wheels to balance the body, lacks a fixed handlebar, and thus has low driving safety. This four-wheeled electric skateboard, being overweight or having no handlebar, is not easy for tow while the user is walking, and thus has low adaptability to crowded and complicated traffic conditions.

For foldable electric vehicles, such as foldable electric scooters, foldable electric bicycles and the like, although they can be folded, they still have large volumes and cannot be erected or towed after being folded, with the folding operation steps complicated. Besides, because they have two parallel wheels, they cannot be kept in balance in place while in riding, and needs the driver to put a foot on the ground to assist the balance, which indirectly affects the driving experience.

Moreover, due to the bar structure of the electric scooter and the four-wheeled electric skateboard, regardless of how the drivers place their feet, they must put their feet one after the other in parallel with the direction of progress. The longitudinal standing driving posture does not meet the natural standing habit of the human body, and long standing will lead to fatigue of leg muscles.

Thus, the existing mini-electric vehicles are mainly transformed on the existing models to be more electricized and foldable, with the structural and functional design unable to break the imprisonment of the old vehicle form, and so these vehicles have a lot of room for breakthroughs in functions and structures during and after folding.

After summarizing the existing electric vehicle products in combination with the urban transport connection problems, the following facts can be found:

(1) Self-balancing electric vehicles, whether one-wheeled or two-wheeled, require real-time assistance of their own balancing devices, consume high power, are heavy, have high prices, cost long learning time and have low safety.

(2) Self-balancing vehicles with two parallel wheels, such as self-balancing swing bikes, are still in a horizontal position during steering, and cannot provide the driver with a centrifugal tilt to keep the driver in balance.

(3) Four-wheeled electric skateboards without a handlebar have high requirements for handling technology and road surface, and need to be carried by the driver while not in driving and cannot be towed, unfit for driving on a crowded and discontinuous urban bike lane.

(4) Foldable electric bicycles and electric motorcycles have high traveling speed and long mileage, but heavy weight.

(5) Two-wheeled scooters with a handlebar are more suitable for public transport connection in urban areas than other types of vehicles. However, at least one foot needs to be dropped off the scooter in the cases of waiting for the traffic light, emergency stop or not in use for an extended period of time, which indirectly affects the driving experience. The longitudinal standing position does not meet the natural standing habit of the human body, and long standing will lead to fatigue of leg muscles.

CONTENTS OF THE DISCLOSURE

In view of the technical problems existing in the prior art, an aspect of the present disclosure is to provide a novel portable electric vehicle with good driving experience as well as small size, light weight and convenient folding.

Another aspect of the present disclosure is to provide a method for controlling the drive of the novel portable electric vehicle by which the electric vehicle can be easily manipulated.

In order to achieve the above aspects, the present disclosure presents the following technical solution:

A novel portable electric vehicle is provided, comprising two front-rear folding mechanisms, a left-right folding mechanism, and an operating mechanism, wherein the two front-rear folding mechanisms for supporting a driver are arranged respectively on the left side and the right side of the bottom of the electric vehicle, the rear ends of the front-rear folding mechanisms are both provided with driving wheel mechanisms, and the front ends of the front-rear folding mechanisms are both provided with rotating wheel mechanisms; two ends of the left-right folding mechanism for driving the two front-rear folding mechanisms to get close to each other are connected respectively to the two front-rear folding mechanisms; and the operating mechanism for controlling the running of the electric vehicle is mounted on the left-right folding mechanism. With this structure, a driver steps on the front-rear folding mechanism and operates the operating mechanism to drive the electric vehicle. When the driving wheels of the driving wheel mechanisms located on the left and right sides of the electric vehicle rotate at different rotational speeds, the rotating wheel mechanisms on the left and right sides are forced to achieve the turning function. When the electric vehicle is not in use, folding the front-rear folding mechanisms and the left-right folding mechanism can greatly reduce the volume of the electric vehicle.

The front-rear folding mechanism comprises a front pedal, a joint block and a rear pedal that are connected in sequence.

With the front pedal installed on the front end of the joint block through a rotatable shaft, a fixed arm of a torsion spring sleeved on the rotatable shaft is fixed on the joint block, and a torsion arm of the torsion spring driving the front pedal to rotate is fixed on the front pedal.

With the rear pedal installed on the rear end of the joint block through the rotatable shaft, a fixed arm of a torsion spring sleeved on the rotatable shaft is fixed on the joint block, and a torsion arm of the torsion spring driving the rear pedal to rotate is fixed on the rear pedal. With this structure, the front-rear folding mechanism can be folded; when the driver does not stand on the front-rear folding mechanism, the front-rear folding mechanism can be automatically folded due to the action of a torsion spring.

The left-right folding mechanism comprises a base, an upper left folding arm and a lower left folding arm arranged parallel to each other, an upper right folding arm and a lower right folding arm arranged in parallel to each other, and a left swing rod and a right swing rod.

One end of the upper left folding arm is rotatably mounted on the right end of the left joint block, and the other end is rotatably mounted on the left side of the base; the lower left folding arm, rotatably mounted on the left side of the base, has one end rotatably mounted on the right end of the left joint block and the other end connected with the left swing rod; the left swing rod driving the rotation of the lower left folding arm is rotatably mounted on the left side of the lower end of the operating mechanism.

One end of the upper right folding arm is rotatably mounted on the left end of the right joint block, and the other end is rotatably mounted on the right side of the base; the lower right folding arm, rotatably mounted on the right side of the base, has one end rotatably mounted on the left end of the right joint block and the other end connected with the right swing rod; and the right swing rod driving the rotation of the lower right folding arm is rotatably mounted on the right side of the lower end of the operating mechanism. With this structure, manipulating operating mechanism can force the left and right swing rods to rotate, so that the folding function of the left-right folding mechanism can be realized.

The operating mechanism comprises an up-down push-pull assembly, a front-rear rotatable assembly, and a left-right rotatable assembly; the up-down push-pull assembly driving folding or unfolding of the left-right folding mechanism is installed on the base, the front-rear rotatable assembly is front-rear rotatably mounted on the upper end of the up-down push-pull assembly, and the left-right rotatable assembly is left-right rotatably mounted on the upper end of the front-rear rotatable assembly. With this structure, the left-right rotatable assembly can achieve the left-right steering of the electric vehicle, the front-rear rotatable assembly can achieve the acceleration and deceleration of the electric vehicle, and the up-down push-pull assembly can drive the left-right folding mechanism to fold.

The left-right rotatable assembly comprises a rotatable base rotatably mounted on the upper end of the front-rear rotatable assembly, and a handlebar disposed on the rotatable base in the left-right direction. With this structure, the handlebar achieves the left-right rotation on the front-rear rotatable assembly through the rotatable base.

The front-rear rotatable assembly comprises a fixed base fixed on the upper end of the up-down push-pull assembly, and a rotatable rod rotatably mounted on the fixed base. With this structure, the rotatable rod can be rotated back and forth, thus giving the electric vehicle an acceleration or deceleration signal.

The up-down push-pull assembly comprises a rod sleeve, a push-pull rod inserted into the rod sleeve, and a retractable block fixed at the lower end of the push-pull rod, wherein the rod sleeve is mounted on the base, the push-pull rod movable up and down relative to the rod sleeve goes through the base, the left swing rod is rotatably mounted on the left side of the retractable block, and the right swing rod is rotatably mounted on the right side of the retractable block. With this structure, the push-pull rod moves up and down, which can drive the left-right folding mechanism to be folded or unfolded.

The rotatable rod is provided at the lower end with a first hole penetrating in the left-right direction, and at the bottom with two longitudinal holes communicated with the first hole, and the two longitudinal holes, both having a first rubber strip inside, are respectively located at the front and rear ends of the bottom of the rotatable rod.

The fixed base is provided with an open groove adapted to the lower end of the rotatable rod, a first shaft is provided in the open groove in the left-right direction, and the rotatable rod is sleeved on the first shaft through the first hole. With this structure, the first rubber strip allows the front-rear rotatable assembly to be automatically reset.

The rotatable base is provided at the lower end with a second hole in the up-down direction, and at the right side with two transversal holes communicated with the second hole; and the two transversal holes, both having a second rubber strip inside, are respectively located at the front and rear ends of the right side of the rotatable base.

The front-rear rotatable assembly is provided at the upper end with a second shaft, on which is rotatably mounted the rotatable base through the second hole. With this structure, the second rubber strip allows the left-right rotatable assembly to be automatically reset.

Further disclosed is a method for controlling the drive of the novel portal electric vehicle, wherein a first acceleration sensor is mounted on the handlebar of the operating mechanism of the electric vehicle, and an ARDUINO circuit board is mounted on the front-rear folding mechanism of the electric vehicle.

When the left-right rotatable assembly on the operating mechanism is rotated, the first acceleration sensor measures a yaw angle vector $Y_1$ in a three-dimensional coordinate Euler angle vector $O_1$, and the ARDUINO circuit board records a yaw angle vector $Y_2$ in a three-dimensional coordinate Euler angle vector $O_2$;

when the front-rear rotatable assembly on the operating mechanism is rotated, the first acceleration sensor measures a pitch angle vector $P_1$ in the three-dimensional coordinate Euler angle vector $O_1$, and the ARDUINO circuit board records a pitch angle vector $P_2$ in the three-dimensional coordinate Euler angle vector $O_2$; and when the handlebar on the left-right rotatable assembly tilts transversally, the first acceleration sensor measures a roll angle vector $R_1$ in the three-dimensional coordinate Euler angle vector $O_1$, and the ARDUINO circuit board records a roll angle vector $R_2$ in the three-dimensional coordinate Euler angle vector $O_2$.

The ARDUINO circuit board calculates a relative Euler angle vector $\Delta O$ of the Euler angle vector $O_1$ and the Euler angle vector $O_2$, wherein $$\Delta O = O_1 - O_2, \ \Delta O = (\Delta P, \Delta Y, \Delta R), \ O_1 = (P_1, Y_1, R_1), \ O_2 = (P_2, Y_2, R_2), \ \Delta P = P_1 - P_2, \ \Delta Y = Y_1 - Y_2, \ \Delta R = R_1 - R_2.$$

The Arduino board calculates a value of n based on the value of $\Delta P$, obtains a turn coefficient k based on the values of $\Delta Y$ and $\Delta R$, and outputs a left rotational speed $n_L$ and a right rotational speed $n_R$ of the driving wheel mechanism of the electric vehicle based on n and k, wherein $$n_L=n(1+k), n_R=n(1-k).$$

With this method, the relative Euler angle vector ΔO is used to judge the driver's operation intention, so as to output the rotational speed to the driving wheel mechanism of the electric vehicle to drive the electric vehicle to run.

The present disclosure reveals the following advantages:
1. The electric vehicle of the present disclosure has a small size after being folded, light weight, convenience in folding, and good driving experience.
2. The left-right folding mechanism and the front-rear folding mechanism of the present disclosure can achieve the folding function simply and quickly.
3. The first and second springs of the present disclosure can achieve a shock-absorbing effect; when the electric vehicle is in a transversal tilt state, both the driving wheel of the driving wheel mechanism and the rotating wheel of the rotating wheel mechanism can contact the ground.
4. The mobile phone on the mobile phone stand of the present disclosure can be combined with the Euler sensor on the front-rear folding mechanism to judge the driver's operation intention.
5. The torsion spring provided by the present disclosure can get the front-rear folding mechanism automatically folded when the driver does not stand on the front-rear folding mechanism.
6. The third spring provided by the present disclosure can help the driver fold the left-right folding mechanism.
7. The cushion provided by the present disclosure can buffer the collision between the front and rear pedals and the joint block.
8. The present disclosure is highly intelligent, lightweight and flexible, and easy to operate.

LIST OF REFERENCE NUMBERS

List of reference numbers: 1. A front-rear folding mechanism; 2. a left-right folding mechanism; 3. a left-right rotatable assembly; 4. a front-rear rotatable assembly; 5. an up-down push-pull assembly; 6. a rotating wheel mechanism; 7. a driving wheel mechanism; 1-1. a front pedal; 1-2. a joint block; 1-3. a rear pedal; 1-4. a torsion spring; 1-5. a rotatable shaft; 1-2-2. A fixed ear; 2-1. a base; 2-2. an upper left folding arm; 2-3. a lower left folding arm; 2-4. an upper right folding arm; 2-5. a lower right folding arm; 2-6. a right swing rod; 2-7. a left swing rod; 2-8. a first spring; 2-9. a second spring; 2-10. a slider; 2-1-1. a front clamp; 2-1-2. a rear clamp; 3-1. a handlebar; 3-2. a rotatable base; 3-3. a mobile phone stand; 3-4. a fixed cover; 3-5. a second rubber strip; 3-2-1. a transversal hole; 3-2-2. a second hole; 4-1. a fixed base; 4-2. a rotatable rod; 4-3. a first shaft; 4-4. a first rubber strip; 4-2-1. a second shaft; 4-2-2. a first hole; 4-2-3. a longitudinal hole; 5-1. a rod sleeve; 5-2. a push-pull rod; 5-3. a third spring; 5-4. a retractable block; 5-5. a disassembly clamp; 5-1-1. a ring wall; 6-1. a third shaft; 7-1. a right guard; 7-2. a left guard; 7-3. a motor; 7-4. a protective cover; 7-5. a belt drive assembly; 7-6. a driving wheel; 7-7. a motor cover; and 7-8. a lampshade.

DETAILED DESCRIPTION OF THE EMBODIMENTS

The present disclosure will be further described below in detail with reference to drawings and embodiments.

The front and rear, left and right, and up and down directions mentioned below are the same as those of a driver's body when the driver is driving, wherein the direction in which the rotating wheel mechanism is located is the front and the direction in which the driving wheel mechanism is located is the rear.

Figure 1:
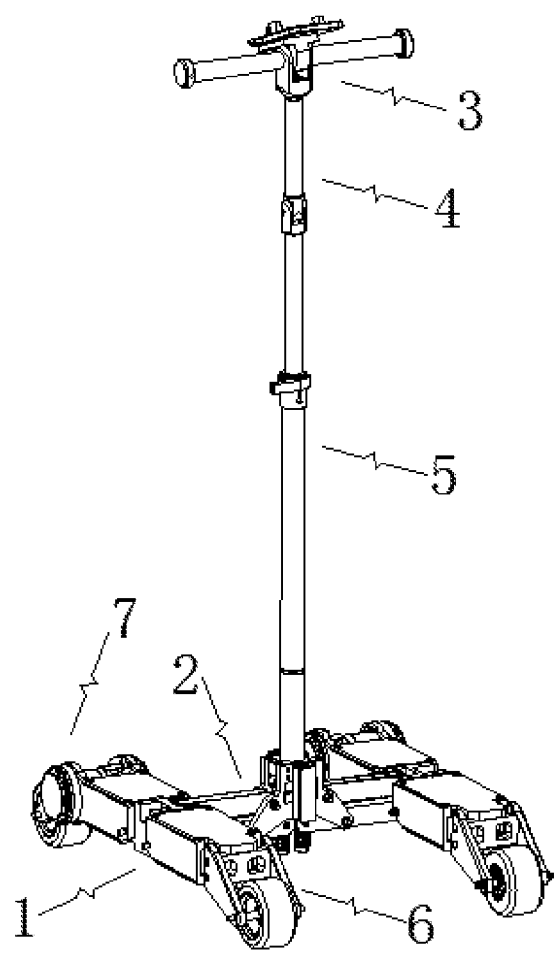
FIG. 1 is a perspective view of the unfolded state of the vehicle.
Figure 2:
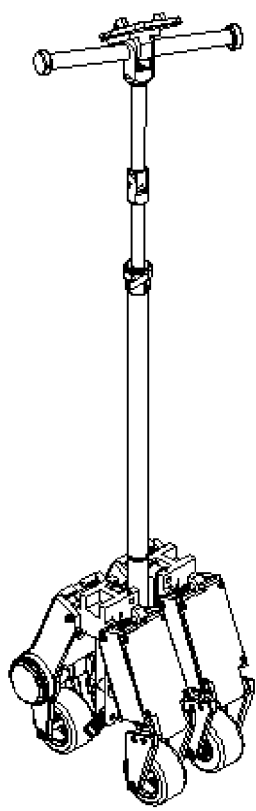
FIG. 2 is a perspective view of the folded state of the vehicle.

As shown in FIGS. 1 and 2, an overall solution of a novel portable electric vehicle is as follows: The novel portable electric vehicle comprises two front-rear folding mechanisms, a left-right folding mechanism, and an operating mechanism, wherein the two front-rear folding mechanisms for supporting a driver are arranged respectively on the left side and the right side of the bottom of the electric vehicle, the rear ends of the front-rear folding mechanisms are both provided with driving wheel mechanisms, and the front ends of the front-rear folding mechanisms are both provided with rotating wheel mechanisms; two ends of the left-right folding mechanism for driving the two front-rear folding mechanisms to get close to each other are connected respectively to the two front-rear folding mechanisms; and the operating mechanism for controlling the running of the electric vehicle is mounted on the left-right folding mechanism.

Figure 3:
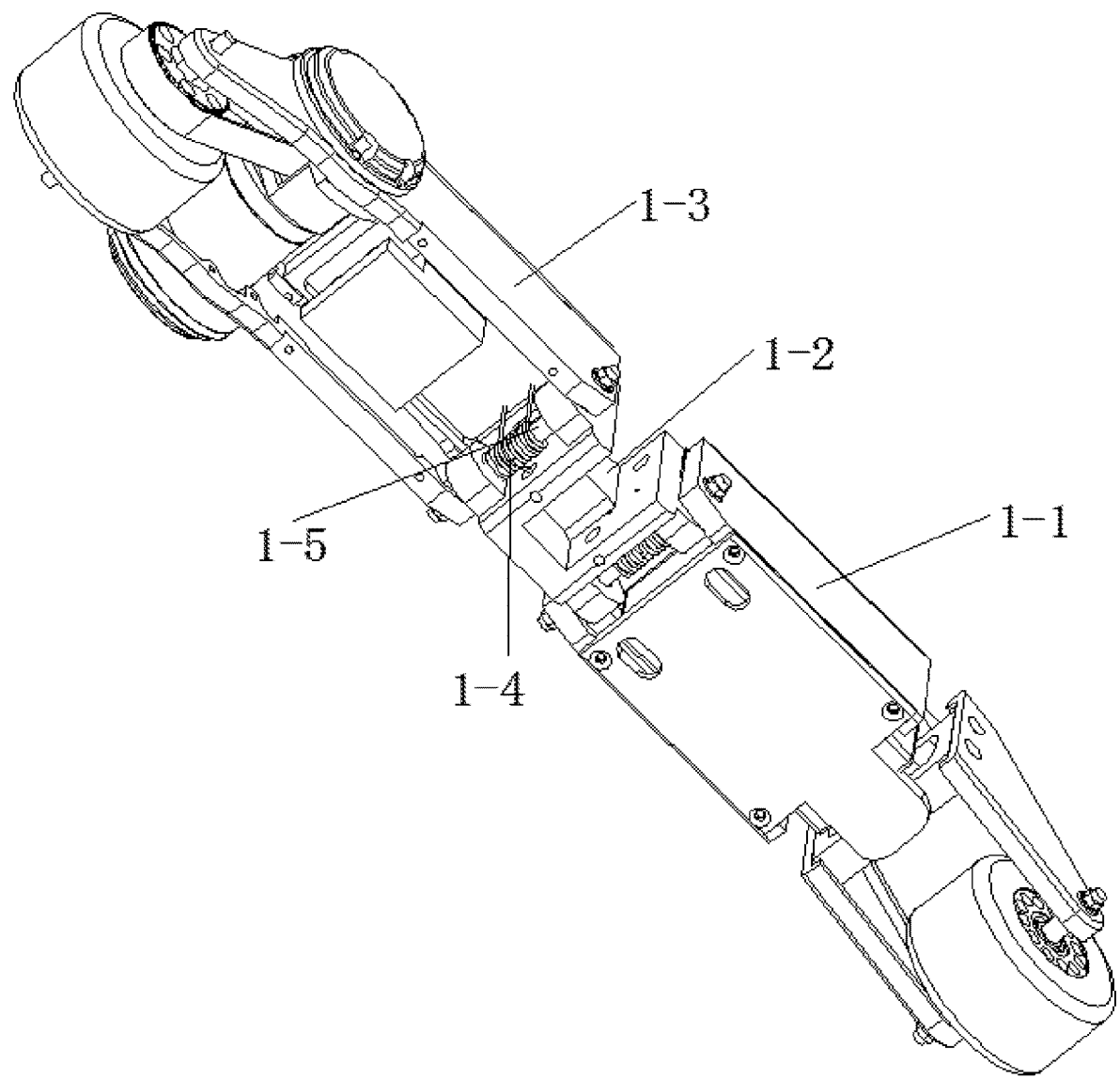
FIG. 3 is a structural schematic view of the front-rear folding mechanism.
Figure 4:
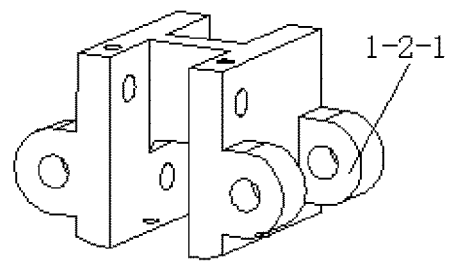
FIG. 4 is a structural schematic view of the joint block.

Each of the mechanisms will be described below in detail:
The front-rear folding mechanism is as follows:
As shown in FIGS. 3 and 4, the front-rear folding mechanism comprises a front pedal, a joint block and a rear pedal that are connected in sequence; the front pedal is a cuboid with a cavity surrounded by an upper cover, a right cover, a lower cover, and a left cover; the joint block is provided on the left and right sides in the front with a prominent fixed ear, on which are arranged a left cover and a right cover; a rotatable shaft is provided on the fixing ear in the left-right direction; the front pedal is installed on the front end of the joint block through the rotatable shaft; a torsion spring is sleeved on the rotatable shaft; the fixed arm of the torsion spring is fixed on the front end of the joint block; and a torsion arm of the torsion spring driving the front pedal to rotate is fixed on the upper cover.

The rear pedal is also a cuboid with a cavity surrounded by an upper cover, a right cover, a lower cover, and a left cover; the joint block is provided on the left and right sides in the rear with a prominent fixed ear, on which are arranged a left cover and a right cover; a rotatable shaft is provided on the fixing ear in the left-right direction; the rear pedal is installed on the rear end of the joint block through the rotatable shaft; a torsion spring is sleeved on the rotatable shaft; the fixed arm of the torsion spring is fixed on the rear end of the joint block; and a torsion arm of the torsion spring driving the rear pedal to rotate is fixed on the upper cover.

The joint block located on the left side of the electric vehicle is provided on the right end face with a groove, in which is rotatably mounted the left end of the left-right folding mechanism. The joint block on the right side of the electric vehicle can be set symmetrically. The joint block is provided at the front and rear ends with a cushion, which can cushion the impact between the front and rear pedals and the joint block.

When the driver does not stand on the front and rear pedals, the torsion arm of the torsion spring drives the front and rear pedals to rotate around the joint block to realize the folding process.

Figure 5:
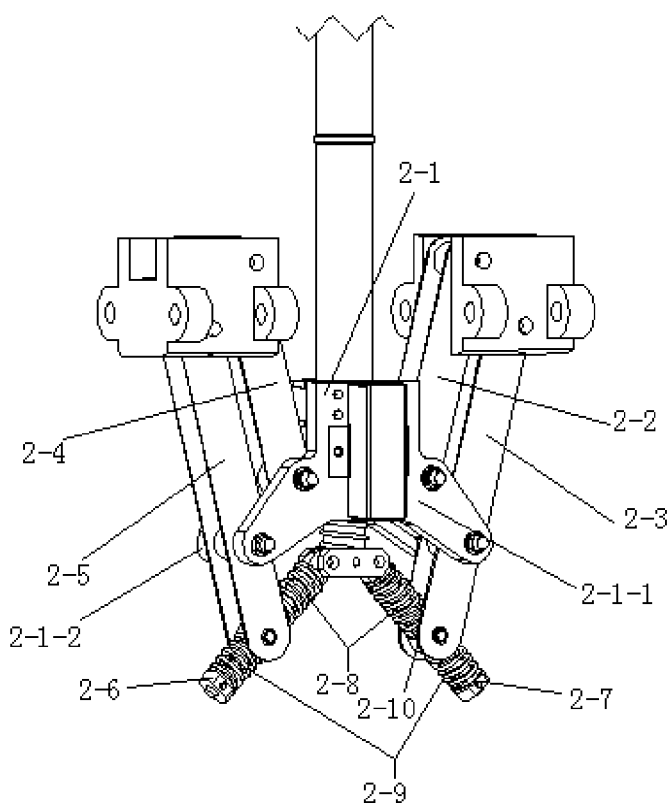
FIG. 5 is a structural schematic view of the left-right folding mechanism.
Figure 9:
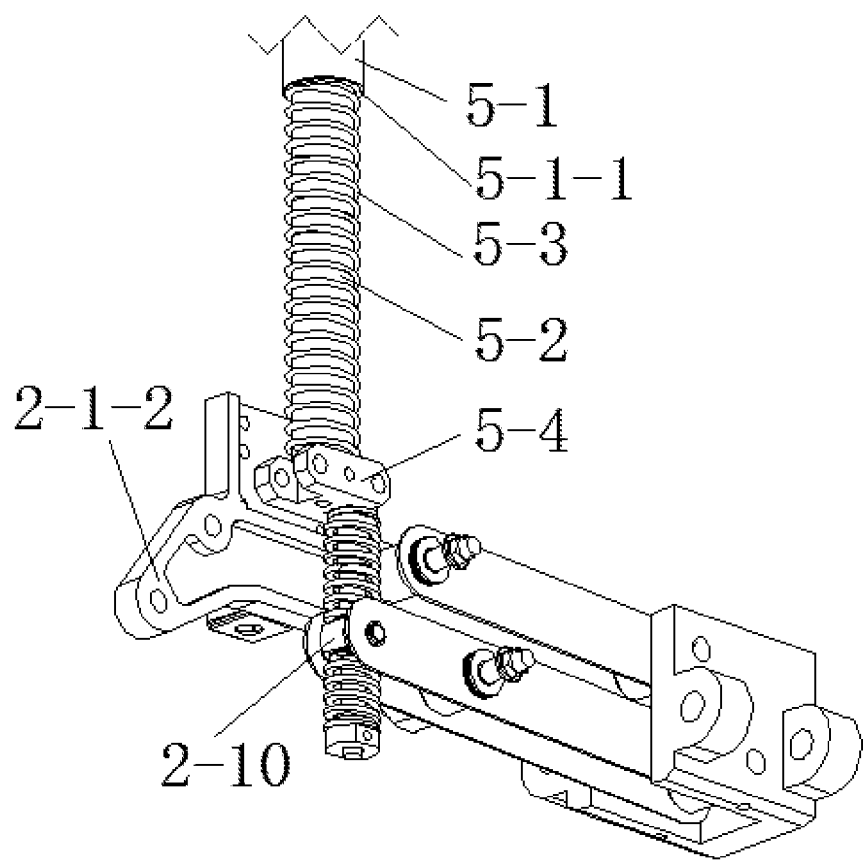
FIG. 9 is a structural schematic view of assembling of the up-down push-pull assembly and the left-right folding mechanism.

The left-right folding mechanism is as follows:

As shown in FIGS. 5 and 9, the left-right folding mechanism comprises a base, an upper left folding arm and a lower left folding arm arranged parallel to each other, an upper right folding arm and a lower right folding arm arranged in parallel to each other, and a left swing rod and a right swing rod.

When the left-right folding mechanism is in the folded state, the upper end of the upper left folding arm is rotatably installed in the groove on the right end face of the left joint block, and the lower end is rotatably mounted on the left side of the base. A part in the middle of the lower left folding arm is rotatably mounted on the left side of the base, and the upper end of the lower left folding arm is rotatably installed in the groove on the right end face of the left joint block, with the lower end connected with the left swing rod. The left swing rod, generally cylindrical and driving the rotation of the lower left folding arm, is rotatably mounted on the left side of the lower end of the operating mechanism. A slider is sleeved on the left swing rod, and can slide along the left swing rod. Two compressed springs, sleeved on the left swing rod, are composed of a first spring located between the slider and the upper end of the left swing rod, and a second spring located between the slider and the lower end of the left swing rod. The lower end of the lower left folding arm is fixed on the slider.

The upper end of the upper right folding arm is rotatably installed in the groove on the left end face of the right joint block, and the lower end is rotatably mounted on the right side of the base. A part in the middle of the lower right folding arm is rotatably mounted on the right side of the base, and the upper end of the lower right folding arm is rotatably installed in the groove on the left end face of the right joint block, with the lower end connected with the right swing rod. The right swing rod, generally cylindrical and driving the rotation of the lower right folding arm, is rotatably mounted on the right side of the lower end of the operating mechanism. A slider is sleeved on the right swing rod, and can slide along the right swing rod. Two compressed springs, sleeved on the right swing rod, are composed of a first spring located between the slider and the upper end of the right swing rod, and a second spring located between the slider and the lower end of the right swing rod. The lower end of the lower right folding arm is fixed on the slider.

The base includes a front clamp and a rear clamp, on the left and right sides of which are arranged an inclined plate, with the upper left folding arm, the lower left folding arm, the upper right folding arm and the lower right folding arm all rotatably installed between the front and rear inclined plates.

Figure 13:
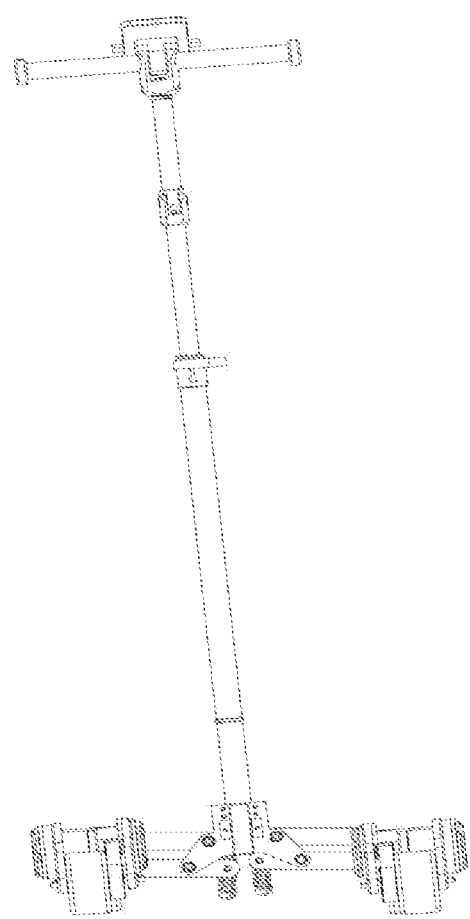
FIG. 13 is a state diagram of the electric vehicle of the present disclosure traveling in a transversal tilt state.

As shown in FIG. 13, when driving on a sloping road or while turning, the driver tilts the handlebar transversally to overcome the centrifugal force so as to balance the movement. When in this state, because the first and second springs force the sliders on the left and right swing rods not to be on the same horizontal plane, both the driving wheel of the driving wheel mechanism and the rotating wheel of the rotating wheel mechanism can contact the ground. When traveling to a flat surface, the first and second springs can also help the driver return to a non-tilted position. The first and second springs can also act as a shock absorber.

The operating mechanism is as follows:

The operating mechanism comprises an up-down push-pull assembly, a front-rear rotatable assembly, and a left-right rotatable assembly; the up-down push-pull assembly driving folding or unfolding of the left-right folding mechanism is installed on the base, the front-rear rotatable assembly is front-rear rotatably mounted on the upper end of the up-down push-pull assembly, and the left-right rotatable assembly is left-right rotatably mounted on the upper end of the front-rear rotatable assembly.

Figure 6:
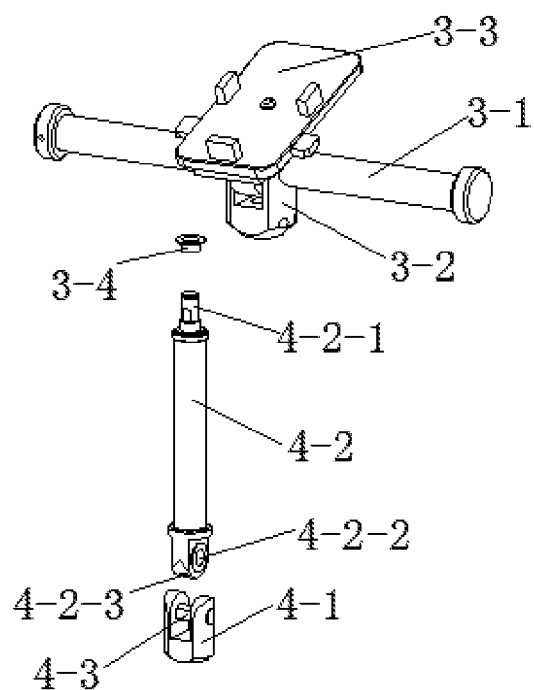
FIG. 6 is an exploded view of the left-right rotatable assembly and the front-rear rotatable assembly.
Figure 7:
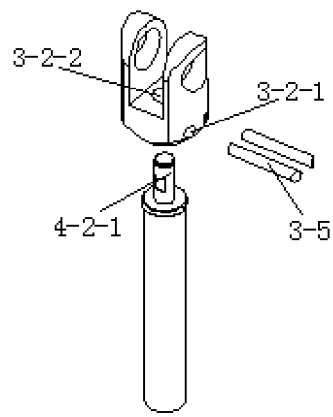
FIG. 7 is an exploded view of the left-right rotatable assembly and the front-rear rotatable assembly at the junction.

As shown in FIGS. 6 and 7, the left-right rotatable assembly comprises a rotatable base left-right rotatably mounted on the upper end of the front-rear rotatable assembly, and a handlebar disposed on the rotatable base in the left-right direction. The handlebar is provided with a mobile phone stand for holding a mobile phone. The upper part of the rotatable base is provided with an open groove penetrating forward and backward through the front and rear ends of the upper part of the rotatable base. The upper part of the rotatable base is also provided with a through hole penetrating in the left-right direction through the left and right ends of the upper part of the rotatable base, and the handlebar passes through the through hole penetrated in the left-right direction to be disposed on the rotatable base. The rotatable base is provided at the lower end with a second hole in the up-down direction, and at the right side with two transversal holes communicated with the second hole. The two transversal holes, both having a second rubber strip inside, are respectively located at the front and rear ends of the right side of the rotatable base. The front-rear rotatable assembly is provided at the upper end with a second shaft, on which is rotatably mounted the rotatable base through the second hole. After the rotatable base is sleeved on the second shaft, a fixed cover is placed on the second shaft passing through the second hole from the open groove so as to fix the rotatable base to the second shaft. With a notch provided in a position where the second shaft is in contact with the second rubber strip, the second rubber strip is in a state of squeezed distortion when the driver turns the handlebar left and right, and the second rubber strip restores the original state after the driver loosens the handlebar to prompt reset of the handlebar.

Figure 8:
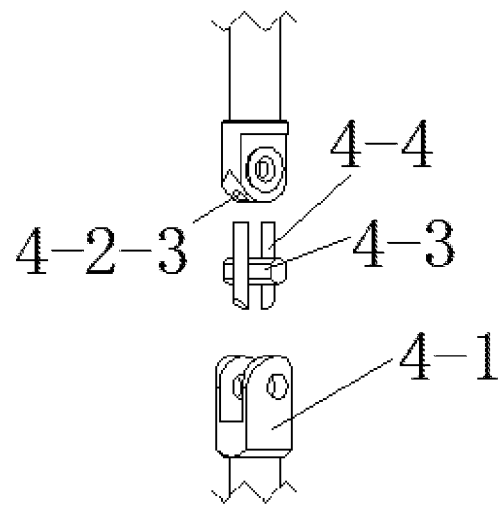
FIG. 8 is an exploded view of the front-rear rotatable assembly.

As shown in FIGS. 6 and 8, the front-rear rotatable assembly comprises a fixed base fixed on the upper end of the up-down push-pull assembly, and a rotatable rod front-rear rotatably mounted on the fixed base. The rotatable rod is provided at the lower end with a first hole penetrating in the left-right direction, and at the bottom with two longitudinal holes communicated with the first hole. The two longitudinal holes, both having a first rubber strip inside, are respectively located at the front and rear ends of the bottom of the rotatable rod. The upper part of the fixed base is likewise provided with an open groove penetrating forward and backward through the front and rear ends of the upper part of the fixed base, and is also provided with a through hole penetrating in the left-right direction through the left and right ends of the upper part of the fixed base. With the open groove on the fixed base adapted to the lower end of the rotatable rod, a first shaft is provided in the open groove in the left-right direction and can be fixed in the through hole extending in the left-right direction on the fixed base, with the rotatable rod sleeved on the first shaft through the first hole. With a notch likewise provided in a position where the first shaft is in contact with the first rubber strip, the first rubber strip is in a state of squeezed distortion when the driver turns the handlebar front and rear, and the first rubber strip restores the original state after the driver loosens the handlebar to prompt reset of the front-rear rotatable assembly.

Figure 10:
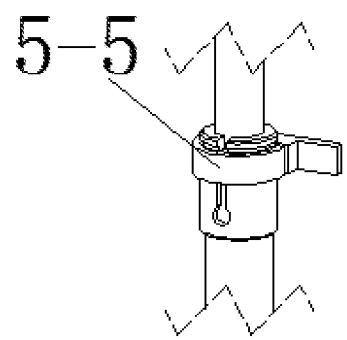
FIG. 10 is a structural schematic view of a disassembly clamp.

As shown in FIGS. 9 and 10, the up-down push-pull assembly comprises a rod sleeve, a push-pull rod inserted into the rod sleeve, and a retractable block and a disassembly clamp fixed at the lower end of the push-pull rod. The lower end of the rod sleeve is fixed on the base, through which goes the push-pull rod movable up and down relative to the rod sleeve. The left swing rod is rotatably mounted on the left side of the retractable block, and the right swing rod is rotatably mounted on the right side of the retractable block. The rod sleeve is provided on the inner wall with a ring wall protruding inward, with a compressed spring (referred to as a third spring) sleeved on the push-pull rod and located between the retractable block and the ring wall. A disassembly clamp is arranged on the upper end of the rod sleeve, and can clamp the push-pull rod surroundedly. When the push-pull rod is pushed downward, the retractable block moves down, so as to drive the left and right swing rods to rotate, thereby promoting the folding of the left-right folding mechanism. When the vehicle needs to be folded laterally, the disassembly clamp is loosened, and the driver can easily fold the vehicle transversally because the third spring has a downward thrust on the retractable block.

Figure 11:
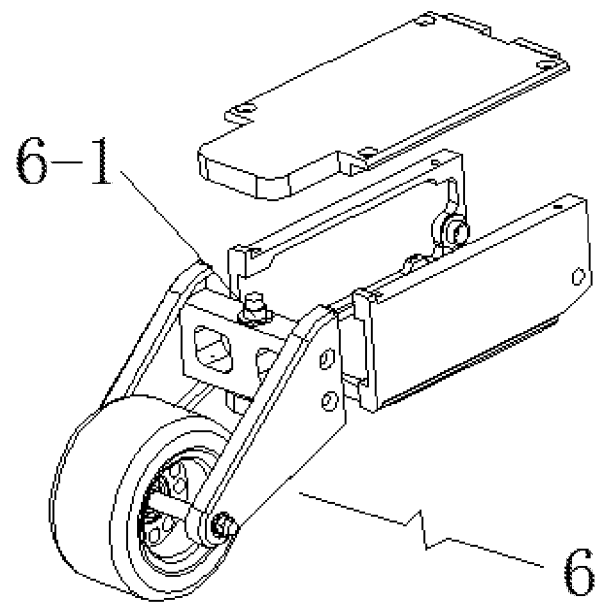
FIG. 11 is a structural schematic view at the rotating wheel mechanism.

The rotating wheel mechanism is as follows:

As shown in FIG. 11, a shaft, referred to as a third shaft, is disposed between the upper and lower covers of the front pedal, and the rotating wheel mechanism can rotate relative to the front pedal through the third shaft.

Figure 12:
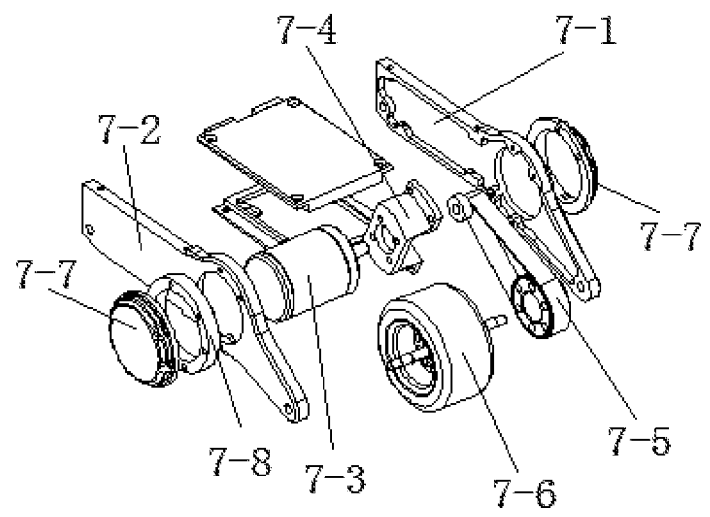
FIG. 12 is a structural schematic view at the driving wheel mechanism.

The driving wheel mechanism is as follows:

As shown in FIG. 12, the driving wheel mechanism comprises a left guard and a right guard fixed on the rear pedal, a motor, a protective cover, a belt drive assembly, a driving wheel, a motor cover and a lampshade. The left guard, provided outside with a lampshade and a motor cover protective for the outside, is fixed on the left cover of the rear pedal, and the right guard, provided outside with a motor cover, is fixed on the right cover of the rear pedal, with the motor fixed on the left guard. The protective cover is fixed on the rotor of the motor. The rotation of the rotor of the motor drives the protective cover to rotate, and the protective cover drives the driving wheel to rotate through the belt drive assembly. The driving wheel is rotatably mounted between the left and right guards, and the drive wheel of the belt drive assembly is fixed on the protective cover, with the protective cover surrounding the drive wheel to play a protective role. When the left and right driving wheels have different speed, the purpose of turning around can be achieved.

When the electric vehicle is driven, a mobile phone could be installed on the mobile phone stand and have a built-in acceleration sensor, and an ARDUINO circuit board and an Euler sensor should be installed on the front-rear folding mechanism. When the handlebar is turned left and right or back and forth, or the handlebar is in the transversal tilt state, the ARDUINO circuit board will process the data measured by the acceleration sensor and the Euler sensor, and then output signals to the motor, so as to control the rotational speed of the motor, thereby achieving the purpose of controlling the electric vehicle. While in use, the driving wheels can also be used as a front wheel.

A method for controlling the drive of the novel portal electric vehicle is described as follows:

A first acceleration sensor is mounted on the handlebar of the operating mechanism of the electric vehicle, and a mobile phone with a built-in acceleration sensor called the first acceleration sensor can be placed on the mobile phone stand; and then an ARDUINO circuit board is mounted on the front-rear folding mechanism of the electric vehicle and can be placed on the lower cover.

When the left-right rotatable assembly on the operating mechanism is rotated, that is, when the handlebar is turned left and right, the first acceleration sensor measures a yaw angle vector $Y_1$ in a three-dimensional coordinate Euler angle vector $O_1$, and the ARDUINO circuit board records a yaw angle vector $Y_2$ in a three-dimensional coordinate Euler angle vector $O_2$;

when the front-rear rotatable assembly on the operating mechanism is rotated, that is, when the handlebar is turned back and forth, the first acceleration sensor measures a pitch angle vector $P_1$ in the three-dimensional coordinate Euler angle vector $O_1$, and the ARDUINO circuit board records a pitch angle vector $P_2$ in the three-dimensional coordinate Euler angle vector $O_2$; and when the handlebar on the left-right rotatable assembly tilts transversally, that is, when the handlebar is tilted relative to the ground, such as driving on a sloping road or turning, the driver needs to tilt the handlebar transversally to overcome the centrifugal force and balance the movement; here the first acceleration sensor measures a roll angle vector $R_1$ in the three-dimensional coordinate Euler angle vector $O_1$, and the ARDUINO circuit board records a roll angle vector $R_2$ in the three-dimensional coordinate Euler angle vector $O_2$.

Then the ARDUINO circuit board calculates a relative Euler angle vector $\Delta O$ of the Euler angle vector $O_1$ and the Euler angle vector $O_2$, with the relative Euler angle vector $\Delta O$ being the driver's operation intention, wherein $$\Delta O = O_1 - O_2,\ \Delta O = (\Delta P, \Delta Y, \Delta R),\ O_1 = (P_1, Y_1, R_1),\ O_2 = (P_2, Y_2, R_2),\ \Delta P = P_1 - P_2,\ \Delta Y = Y_1 - Y_2,\ \Delta R = R_1 - R_2.$$

The ARDUINO board calculates a value of n based on the value of $\Delta P$, obtains a turn coefficient k based on the values of $\Delta Y$ and $\Delta R$, and outputs a left rotational speed $n_L$ and a right rotational speed $n_R$ of the driving wheel mechanism of the electric vehicle based on n and k, wherein $$n_L = n(1+k), n_R = n(1-k).$$

For the sake of convenience, the above yaw angle vector Yaw is abbreviated as Y, the pitch angle vector Pitch is abbreviated as P, and the roll angle vector Roll is abbreviated as R.

On the front-rear folding mechanism are mounted an integrated gyro sensor, a second acceleration sensor, and an Euler sensor of a geomagnetic sensor.

Figure 14:
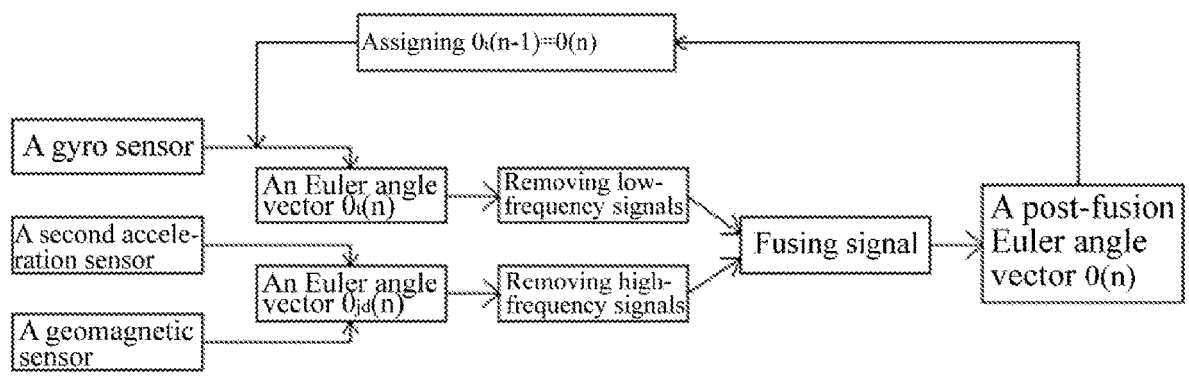
FIG. 14 is a flowchart of a data fusion method of complementary filtering of the present disclosure.

The second acceleration sensor is susceptible to external acceleration, the geomagnetic sensor is susceptible to magnetic interference, and the gyro sensor has drift phenomena, accumulation errors and other issues; the present disclosure adopts the complementary filtering data fusion method to process the data of each sensor. As shown in FIG. 14, a high-pass filter is used to process the Euler angle vector data obtained from the gyro sensor to eliminate the data drift; a low-pass filter is used to eliminate the high-frequency signals calculated by the second acceleration sensor and the geomagnetic sensor; and finally compensation calculation will be made on the two groups of data.

The gyro sensor is used to measure an Euler angle vector $O_t(n)$, and the second acceleration sensor and the geomagnetic sensor are jointly used to measure an Euler angle vector $O_{jd}(n)$, wherein $$O_t(n)=O_t(n-1)+\Delta t R_t, \; O_{jd}(n)=\alpha O_{jd}(n-1)+(1-\alpha)O_{YP}.$$

Wherein $\Delta t$ is a sampling period, $O_t(n-1)$ is the last measured Euler angle vector $O_t(n)$, and $R_t$ is an angular velocity vector measured by the gyro sensor. $\alpha$ is the filter coefficient; according to a method proposed by Shane Colton, better results can be got when $\alpha=0.98$, wherein $O_{jd}(n-1)$ is the Euler angle vector jointly measured last time by the second acceleration sensor and the geomagnetic sensor, and $O_{YP}$ is the Euler angle vector jointly measured by the second acceleration sensor and the geomagnetic sensor. With $(1-\alpha)O_{YP}$ as a low-frequency signal of the data, it is planned to remove the high-frequency signal $O_{jd}(n-1)$ in $\alpha O_{jd}(n-1)$, then the Euler angle vector $O_t(n)$ measured by the gyro sensor is used to replace $O_{jd}(n-1)$, and at the same time a high-frequency signal of $O_t(n)$ is introduced, thereby obtaining:

$$O(n)=\alpha O_t(n)+(1-\alpha)O_{YP}.$$

Wherein $O(n)$ is a post-fusion Euler angle vector and can be thought of as $O_2$ for calculating $\Delta O$.

In order to prevent the electric vehicle from encountering an obstacle, a sudden deceleration makes the driver, driven by inertia, vigorously operate the handlebar; or when the handlebar is stationary, because of misoperation of the Euler sensor due to data jitter at the zero point, the present disclosure sets the thresholds $P_L$ and $P_H$; the rotational speed is outputted only when the value of $\Delta P$ is greater than the lower threshold of $P_L$, and the rotational speed will not be increased when the value of $\Delta P$ is greater than the upper threshold of $P_H$.

In addition to the safety margin setting in the speed direction, in order to avoid an accident caused by the driver making a drastic operation in the moment, the present disclosure also sets another threshold for the overall movement of the electric vehicle:

$$Acc=\sqrt{Acc_x^2+Acc_y^2+Acc_z^2}.$$

Wherein $Acc_x$, $Acc_y$ and $Acc_z$ respectively represent the acceleration values in three orthogonal directions. With a threshold $Acc_0$ given for Acc, when Acc is greater than the threshold value of $Acc_0$, the occurrence of a misoperation can be judged, and then the current rotational speed will be set as the safe rotational speed threshold and locked, i.e., the speed of the motor cannot be increased at this time. When Acc is less than the threshold, and the current input rotational speed is less than the locked rotational speed, the lock will be released.

The examples as described above are the preferred embodiments of the present disclosure. However, the embodiments of the present disclosure are not limited to the examples as described above. Any other modification, polish, substitution, combination and simplification, so long as not departing from spiritual substance of the present disclosure, should be equivalent displacement, and fall within the extent of protection of the present disclosure.

What is claimed is:

1. A portable electric vehicle comprising two front-rear folding mechanisms, a left-right folding mechanism, and an operating mechanism, wherein the two front-rear folding mechanisms for supporting a driver are arranged respectively on the left side and the right side of the bottom of the electric vehicle, the rear ends of the front-rear folding mechanisms are both provided with rotating wheel mechanisms; two ends of the left-right folding mechanism for driving the two front-rear folding mechanisms to get close to each other are connected respectively to the two front-rear folding mechanisms; and the operating mechanism for controlling the running of the electric vehicle is mounted on the left-right folding mechanism.

2. The portable electric vehicle according to claim 1, the front-rear folding mechanism comprises a front pedal, a joint block and a rear pedal that are connected in sequence;
with the front pedal installed on the front end of the joint block through a rotatable shaft, a fixed arm of a torsion spring sleeved on the rotatable shaft is fixed on the joint block, and a torsion arm of the torsion spring driving the front pedal to rotate is fixed on the front pedal; and
with the rear pedal installed on the rear end of the joint block through the rotatable shaft, a fixed arm of a torsion spring sleeved on the rotatable shaft is fixed on the joint block, and a torsion arm of the torsion spring driving the rear pedal to rotate is fixed on the rear pedal.

3. The portable electric vehicle according to claim 1, the left-right folding mechanism comprises a base, an upper left folding arm and a lower left folding arm arranged parallel to each other, an upper right folding arm and a lower right folding arm arranged in parallel to each other, and a left swing rod and a right swing rod;
one end of the upper left folding arm is rotatably mounted on the right end of the left joint block, and the other end is rotatably mounted on the left side of the base; the lower left folding arm, rotatably mounted on the left side of the base, has one end rotatably mounted on the right end of the left joint block and the other end connected with the left swing rod; the left swing rod driving the rotation of the lower left folding arm is rotatably mounted on the left side of the lower end of the operating mechanism; and
one end of the upper right folding arm is rotatably mounted on the left end of the right joint block, and the other end is rotatably mounted on the right side of the base; the lower right folding arm, rotatably mounted on the right side of the base, has one end rotatably mounted on the left end of the right joint block and the other end connected with the right swing rod; and the right swing rod driving the rotation of the lower right folding arm is rotatably mounted on the right side of the lower end of the operating mechanism.

4. The portable electric vehicle according to claim 3, the operating mechanism comprises an up-down push-pull assembly, a front-rear rotatable assembly, and a left-right rotatable assembly; the up-down push-pull assembly driving folding or unfolding of the left-right folding mechanism is installed on the base, the front-rear rotatable assembly is front-rear rotatably mounted on the upper end of the up-down push-pull assembly, and the left-right rotatable assembly is left-right rotatably mounted on the upper end of the front-rear rotatable assembly.

5. The portable electric vehicle according to claim 4, the left-right rotatable assembly comprises a rotatable base rotatably mounted on the upper end of the front-rear rotatable assembly, and a handlebar disposed on the rotatable base in the left-right direction.

6. The portable electric vehicle according to claim 5, the rotatable base is provided at the lower end with a second hole in the up-down direction, and at the right side with two transversal holes communicated with the second hole; and the front-rear rotatable assembly is provided at the upper end with a second shaft, on which is rotatably mounted the rotatable base through the second hole.

7. The portable electric vehicle according to claim 4, the front-rear rotatable assembly comprises a fixed base fixed on the upper end of the up-down push-pull assembly, and a rotatable rod rotatably mounted on the fixed base.

8. The portable electric vehicle according to claim 7, the rotatable rod is provided at the lower end with a first hole penetrating in the left-right direction, and at the bottom with two longitudinal holes communicated with the first hole; and the two longitudinal holes, both having a first rubber strip inside, are respectively located at the front and rear ends of the bottom of the rotatable rod; and the fixed base is provided with an open groove adapted to the lower end of the rotatable rod, a first shaft is provided in the open groove in the left-right direction, and the rotatable rod is sleeved on the first shaft through the first hole.

9. The portable electric vehicle according to claim 4, the up-down push-pull assembly comprises a rod sleeve, a push-pull rod inserted into the rod sleeve, and a retractable block fixed at the lower end of the push-pull rod, wherein the rod sleeve is mounted on the base, the push-pull rod movable up and down relative to the rod sleeve goes through the base, the left swing rod is rotatably mounted on the left side of the retractable block, and the right swing is rotatably mounted on the right side of the retractable block.

* * * * *